United States Patent [19]

Sano et al.

[11] 3,842,725

[45] Oct. 22, 1974

[54] FRYING APPLIANCE

[75] Inventors: Yoshiaki Sano; Yoshitaka Hirose; Yasumasa Miki, all of Osaka, Japan

[73] Assignee: Matsushita Electric Industrial Company, Osaka, Japan

[22] Filed: Oct. 30, 1972

[21] Appl. No.: 301,754

[30] Foreign Application Priority Data

Apr. 17, 1972 Japan.............................. 47-38839

[52] U.S. Cl. .................................. 99/403, 55/90
[51] Int. Cl. ............................................. A47j, E24c
[58] Field of Search ............ 99/403, 407, 341, 336; 55/90, 233, DIG. 30

[56] References Cited
UNITED STATES PATENTS

| | | | |
|---|---|---|---|
| 2,753,436 | 7/1946 | Schwenke | 99/403 X |
| 3,618,587 | 11/1971 | Lee, Sr. | 99/403 X |
| 3,633,346 | 1/1972 | Illingworth | 55/90 X |

FOREIGN PATENTS OR APPLICATIONS 1,289,501  2/1962  France .................. 99/403

*Primary Examiner*—Harvey C. Hornsby

[57] ABSTRACT

An improved frying appliance for frying foodstuffs, comprising: a container for holding frying oil having a basket for receiving an article of food, a heater arrangement for heating up the frying oil and a vent pipe for giving vent to unpleasant fumes and odours arising from the frying oil during cooking; closure means to provide a closed chamber in the container; a fume absorber having a tubular member for allowing a stream of water to run therethrough, a fume inlet opening arranged on the tubular wall of the absorber and a perforated transverse plate member disposed therein on the upstream side of the fume inlet opening; and a fume conveying duct providing communication between the space inside the container and the fume inlet opening.

7 Claims, 6 Drawing Figures

3,842,725

FRYING APPLIANCE

This invention relates generally to a frying appliance, and specifically to an electrical frying appliance which utilizes a stream of running water for absorbing fumes and odours arising from the foodstuff and frying oil during frying operation.

Numerous types of frying appliances are known in the art and most of these appliances use porous material such as active charcoal or steel wool for the purpose of removing objectionable fumes and odours given off during frying operation. In the prior art appliances, the porous material is accommodated in a cartridge type housing placed in the flow path formed in the frying appliance, and fumes and odours are exhausted through the housing. While passing through the porous material confined in the housing, unpleasant gaseous materials contained in the fumes are absorbed by the porous material through the surface attraction of the porosity of the material. However, excessive use of such material would cause blockage of the flow path and, consequently, frequent changing of the porous material is necessary. This inevitably increases the total cost of the appliance.

It is therefore an object of the present invention to provide an improved frying appliance wherein the total cost of the appliance is kept at minimum.

Another object of the invention is to provide an improved frying appliance which can effectively absorb objectionable fumes and odours given off during frying operation.

A further object of the invention is to provide an improved frying appliance which utilizes a stream of running water for absorbing objectionable fumes and odours given off during frying operation.

These and other features of the invention will be more clearly understood from the following description with reference to the accompanying drawings in which.

Figure 1:
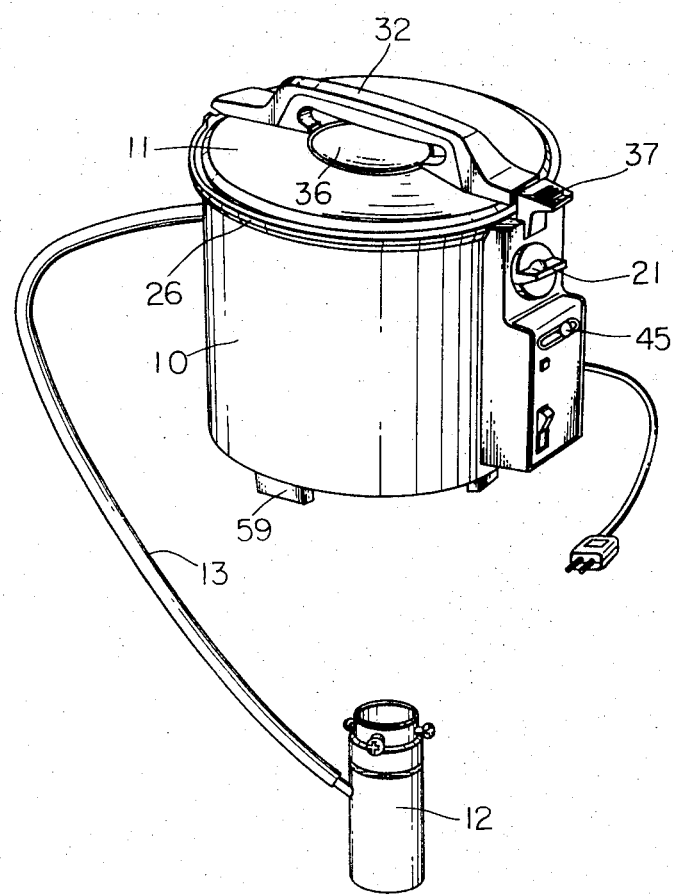
FIG. 1 is a top perspective view of a frying appliance according to the present invention with a lid placed in position for use.
Figure 2:
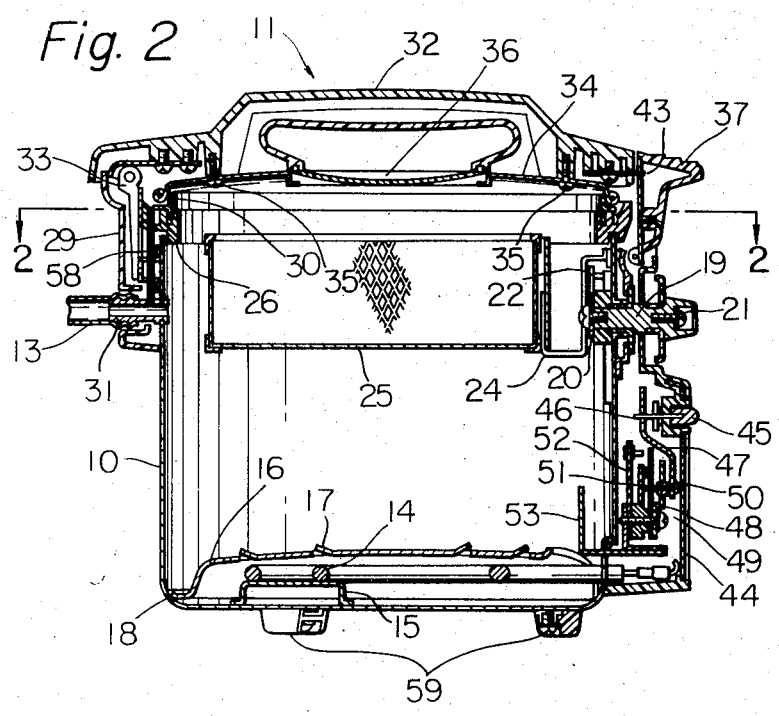
FIG. 2 is a sectional view of the frying appliance taken along line 2—2 in FIG. 1.
Figure 3:
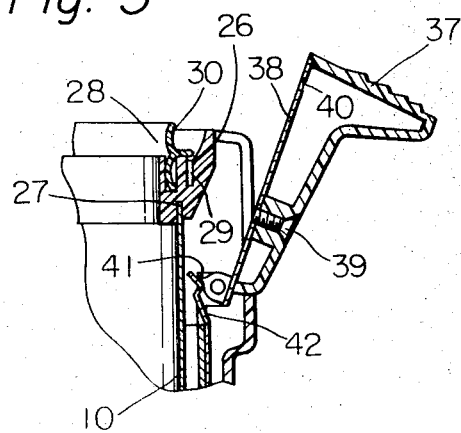
FIG. 3 is a sectional view of a manually operated lever portion of the frying appliance of FIG. 2.
Figure 4:
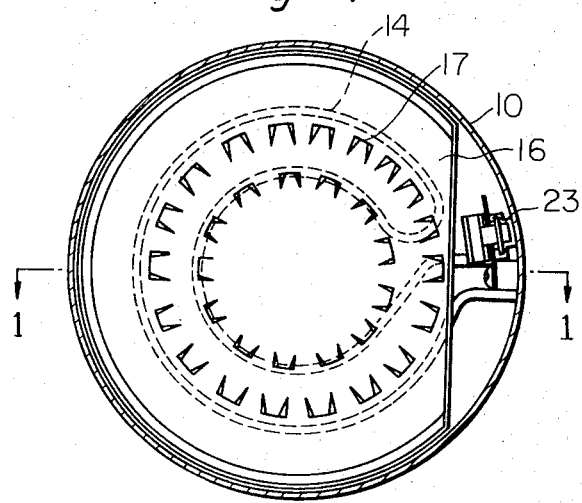
FIG. 4 is a sectional view of the frying appliance taken along line 4—4 in FIG. 2.
Figure 5:
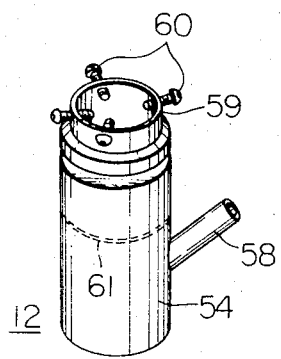
FIG. 5 is a perspective view of a fume absorber of the frying appliance of FIG. 1.
Figure 6:
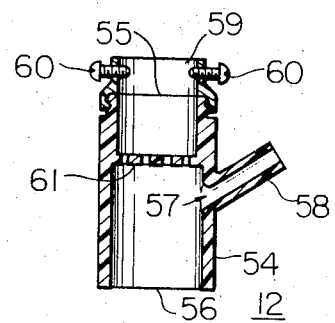
FIG. 6 is a sectional view in elevation of the fume absorber of FIG. 5.

Briefly described, the frying appliance of this invention comprises a container for holding frying oil and having a vent pipe on the side wall thereof for giving vent to fumes and odours arising from the foodstuff and frying oil during frying operation, a fume absorber having a tubular member provided with a fume inlet opening on the side wall thereof, and a fume conveying duct communicating between the space inside the container and the fume absorber. In operation, a stream of water as supplied from the city water system is admitted into one end of the fume absorber and allowed to discharge from the other end of the absorber. The fumes and odours conveyed through the duct lead through the fume inlet opening of the absorber and are scrubbed out with the water running therethrough and then allowed to dissolve in the water, whereby the fumes and odours are effectively absorbed by the water. The fume absorber preferably includes a perforated transverse member disposed therein on the upstream side of the fume inlet opening so as to create bubbles on the downstream side of the transverse member to promote the scrubbing out the fumes with the running water.

The frying appliance according to the present invention generally comprises a cylindrical container 10 for holding frying oil, a lid 11 placed in position for use over the container for providing a closed chamber in the container 10, a fume absorber 12 and a fume conveying duct 13 providing communication between the space inside the container and the space inside the fume absorber. The container 10 which is, for example, made of stainless steel or aluminum sheet carries therein on its bottom an armored contoured electric heater 14 including a heating resistance of, for example, nichrome wire (not shown), and rests by its bottom on a plurality of bosses 63 of plastic material. The armored heater 14 has a circularly contoured shape and leads to the outside through the side wall of the container so as to ensure the supply of electric current. The heater 14 may be spaced from the bottom surface of the container 10 by means of a support member 15 in order to reduce the amount of heat dissipated from the bottom. Overlying the heater 14 is a shielding plate 16 which is preferably dome-shaped and has a plurality of slots 17 preferably facing toward the edge of the shielding plate and a gutter 18 formed on the peripheral edge of the plate 16, so that the heater 14 is protected from the water droplets and slurry arising from the foodstuff which is being fried. A control shaft 19 is journaled through an opening provided on the side wall of the container 10 and carries at the inner end a pinion 20 and at the outer end a hand knob 21. The pinion 20 engages with a rack 22 vertically slidably mounted on a guide member 23 secured to the side wall of the container. On the rack 22 is fastened a U-shaped support member 24 on which a basket 25 for holding an article of food is detachably mounted. The basket 25 is raised or lowered as desired by manual rotation of the knob 21. A flange 26 made of a heat-resistive plastic is removably mounted on the rim 27 of the container 10. A pair of grooves 28 and 29 are formed on the upper surface of the flange 26. A gasket 30 made of a heat-resistive elastic material such as silicon rubber is snugly fitted into the groove 28. A short vent pipe 31 is provided on the outer side wall of the container 10 so as to be communicative with the interior of the container. A vertical duct 62 is connected at one end thereof to the groove 29 and at the other end to the vent pipe 31 allowing communication between the duct 62 and the groove 29.

The lid 11 includes a handle member 32 pivotally mounted at one end thereof to a support member 33 secured to the outer wall of the container 10 and a dome-shaped cover member 34 secured to the handle 32 by means of screw members 35. The cover member 34 has on its edge a circular wall bent downwardly and outwardly so that the cover member 34 is brought into air-tight contact with the gasket 30 when the lid is placed in the closed position. The cover member 34 may have at the central portion thereof a window paned with a transparent dish-shaped member 36 to make the foodstuff visible from the outside. The handle 32 has a central portion bridging the window 36 and the other end thereof so arranged as to engage a manually operated lever 37. The manually operated lever 37 is made of a plastic material and is provided with a metal plate 38 secured to the lever 37 by a screw member 39. The metal plate 38 has therein an opening 40 adjacent the upper end thereof and a cam 41 at the lower end thereof. The cam 41 is pivotally mounted to a support member (not shown) secured to the side wall of the container 10 and engages a leaf spring 42 when the lever 36 is pushed toward the lid 11. In this instance, with the lid placed in the closed position, the manually operated lever 37 is moved to a position so that the opening 40 receives a projection 43 secured to the open side of the lid 11 so as to put the lid in the locked condition.

On the outer side wall of the container 10 and adjacent the lower end of the lever 37 is mounted a housing 44 of moulded plastic. On the outer side wall of the housing 44 is slidably mounted a temperature control knob 45 provided with a bar or rod 46 having an opening at its extremity. In the housing 44, the upper end of a guide member 47 is loosely coupled with the opening and the lower end of the guide member 47 is pivotally secured to a support member 48 of a thermostat 49 by a screw member 50. The thermostat 49 has a pair of contacts 51 and a bimetal contact 52 connected to a temperature sensing element 53 extending fluid-tightly into the container 10. The slidable movement of the control knob 45 causes the adjusting screw 50 to move axially so that the contacts 51 are moved toward or away from the bimetal 52.

The fume absorber 12 comprises a ring member 59 provided with screw members 60 and a housing or tubular member 54 having inlet and outlet open ends 55 and 56 and having a fume inlet opening 57 on the side wall thereof and a spout member 58 mounted on the side wall of the tubular member 54 so as to communicate with the opening 57. The spout member 58 extends outwardly and radially from the side wall of the tubular member and is preferably inclined toward the inlet open end 55. The ring member 59 is threadably engaged with the inlet open end 55 and is normally secured to a water faucet of the city water system by the screws 60. The tubular member 54, when not in use, may be separated from the ring member 59. The fume absorber 12 further includes a perforated transverse plate member 61 positioned on the upstream side of the fume inlet opening 57 so that bubbles are created on the downstream side of the perforated member 61 when a stream of water is admitted into the inlet open end 55. One end of the duct 13 is removably connected with the spout 58 and the other end thereof is removably connected with the vent pipe 31 so that the fumes produced in the container 10 are fed through the duct 13 and admitted into the absorber 12 and thus scrubbed with the water running therethrough. To create bubbles efficiently in the running water it is preferable that the tubular member 54 is so constructed that the inner diameter of the upstream portion of the tubular member defined by the inlet open end 55 and the perforated transverse member 61 is smaller than that of the downstream portion of the tubular member defined by the outlet open end 56 and the transverse member 61.

In operation, the basket 25 is filled with articles of food: the lid 11 is placed in position over the container 10: and the current is allowed to flow through the heater 14 to heat up the frying oil. When the frying oil is appropriately heated up, the basket 25 is lowered by rotation of the hand knob 21 so that the foodstuff is immersed into the hot frying oil. A stream of water is, on the other hand, allowed to run through the fume absorber 12 which may be connected removably to a water plug of the public water supply system. As the water flows through the absorber 12 it strikes the perforated transverse plate member 61, producing bubbles in the stream of water in the downstream portion of the transverse member 61. Fumes and odours arising from the frying oil during frying operation are fed through the duct 13 and admitted into the absorber 12 wherein the fumes are scrubbed with the flowing water with the aid of the bubbles. During frying operation vapors arise from water-containing foodstuff and condense on the inside cover surface of the lid 11, and part of the condensed water may return to the container 10. Without the shielding plate 16, the water would accumulate beneath the frying oil and, at intervals, vaporize violently, thereby causing spurts of oil. Moreover, slurry arising from the foodstuff would build up on the bottom surface of the container 10 and on the heater 14. Therefore, the provision of a shielding plate overlying the heater reduces the need for cleaning the bottom of the container. Since the shielding plate 16 has a domed surface, the water droplets are caused to slide down the sloped portion of the plate and collect in the gutter 18. When the lid 11 is brought to the open position after cooking, the peripheral edge of the lid is moved to a position directly above the groove 29 so that the water condensed on the inside cover surface of the lid is collected in the groove and discharged through the duct 58 into the vent pipe 31.

Although the present embodiment employs a manually operated lever for holding the lid in the locked position in order to overcome the inside air pressure, this lever may be dispensed with if a lid having a weight sufficient to overcome the air pressure is used instead.

It is apparent from the foregoing that the fume absorber of the present invention may be adapted for use with any fume-producing source for the purpose of removing objectionable gaseous materials. All modifications of the present embodiment will also be apparent to those skilled in the art without departing from the scope of the invention. Therefore, the present embodiment is only illustrative and not restrictive.

What is claimed is:

1. A frying appliance comprising: a container for holding frying oil; closure means for fluid-tightly sealing said container; a heating arrangement adjacent the lower portion of said container for applying heat to the frying oil; a fume absorber to vent fumes and odors arising from foodstuff and frying oils during a frying operation comprising a housing member provided with inlet for connection to a water source and outlet open ends in axial alignment with said inlet for admitting a stream of water therethrough, a fume inlet opening on the side wall thereof and means located above said opening in said side wall and extending across said housing member in the path of said stream of water for producing bubbles in the water in said housing; and vent means providing communication between the space inside said container and said fume inlet opening such that said fumes and odors are scrubbed with said water.

2. A frying appliance as claimed in claim 1, wherein said bubble producing means is a perforated transverse member disposed on the upstream side of said fume inlet opening.

3. A frying appliance as claimed in claim 1, wherein said heating arrangement includes an electric heater positioned in the lower portion said container and a shielding plate overlying said heater so as to prevent said heater from contacting water droplets arising from water-containing foodstuff.

4. A frying appliance as claimed in claim 1, wherein said housing member includes a spout, one end of said spout being communicative with said fume inlet opening and the other end of said spout extending outwardly in a direction inclined toward said inlet open end.

5. A frying appliance as claimed in claim 1, wherein said container includes a vent pipe secured to the outer side wall of said container so as to be communicative with the interior of said container, a pair of grooves on the upper end thereof and a vertically extending conduit pipe so arranged adjacent the outer side wall of said container as to provide communication between said vent pipe and one of said grooves.

6. A frying appliance as claimed in claim 3, wherein said shielding plate is upwardly concave shaped and provided with an annular groove fomed around the edge thereof so as to collect said water droplets in said groove.

7. A frying appliance as claimed in claim 6, wherein said shielding plate has a plurality of slots, said slots facing substantially horizontally outwardly and radially arranged on said shielding plate.

* * * * *